US009325562B2

(12) United States Patent
 Kamath et al.

(10) Patent No.: US 9,325,562 B2
(45) Date of Patent: Apr. 26, 2016

(54) OVERLAY TUNNEL INFORMATION EXCHANGE PROTOCOL

(75) Inventors: Dayavanti G. Kamath, Santa Clara, CA (US); Keshav G. Kamble, Fremont, CA (US); Jayakrishna Kidambi, San Jose, CA (US); Abhijit P. Kumbhare, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 13/472,410

(22) Filed: May 15, 2012

(65) Prior Publication Data

US 2013/0311637 A1 Nov. 21, 2013

(51) Int. Cl.
 *H04L 29/08* (2006.01)
 *H04L 12/46* (2006.01)
 *H04L 29/12* (2006.01)

(52) U.S. Cl.
 CPC ...... *H04L 29/08576* (2013.01); *H04L 12/4633* (2013.01); *H04L 12/4641* (2013.01); *H04L 61/103* (2013.01)

(58) Field of Classification Search
 CPC .............. H04L 12/4641; H04L 61/103; H04L 12/4633; H04L 29/08576
 USPC ........................................................ 709/224
 See application file for complete search history.

(56) References Cited

U.S. PATENT DOCUMENTS

| 8,166,205 | B2 | 4/2012 | Farinacci et al. |
| 8,190,769 | B1* | 5/2012 | Shukla et al. ................. 709/238 |
| 8,239,863 | B2* | 8/2012 | Bhat et al. ......................... 718/1 |
| 8,645,576 | B2 | 2/2014 | Farinacci et al. |
| 2005/0182853 | A1* | 8/2005 | Lewites et al. ................ 709/238 |
| 2006/0045089 | A1* | 3/2006 | Bacher et al. ................. 370/392 |
| 2007/0140263 | A1* | 6/2007 | Mitome et al. ........... 370/395.53 |
| 2007/0280243 | A1* | 12/2007 | Wray et al. .................... 370/392 |

(Continued)

FOREIGN PATENT DOCUMENTS

| CN | 101765827 A | 6/2010 |
| EP | 0860958 A1 | 8/1998 |

(Continued)

OTHER PUBLICATIONS

U.S. Appl. No. 13/779,532, filed Feb. 27, 2013.

(Continued)

*Primary Examiner* — Philip Chea
*Assistant Examiner* — Robert B McAdams
(74) *Attorney, Agent, or Firm* — Zilka-Kotab, PC

(57) ABSTRACT

In one embodiment, a system includes logic adapted for receiving, at a first end point station, an information exchange packet from each end point station in a virtual network having a specified virtual network identifier (VNID) and logic adapted for processing each received information exchange packet to retrieve information about connections at each end point station in the virtual network having the specified VNID, wherein each end point station either terminates or originates a tunnel shared by the first end point station in an overlay network. In this way, the information may be used to respond to address resolution protocol (ARP) requests sent locally in lieu of flooding the ARP request. Other systems, methods, and computer program products are also presented regarding the overlay tunnel information exchange protocol, according to various embodiments.

17 Claims, 7 Drawing Sheets

(56) References Cited

U.S. PATENT DOCUMENTS

| | | | |
|---|---|---|---|
| 2009/0037607 A1 | 2/2009 | Farinacci et al. | |
| 2009/0199177 A1* | 8/2009 | Edwards et al. | 718/1 |
| 2010/0058051 A1* | 3/2010 | Imai | 713/152 |
| 2010/0290398 A1* | 11/2010 | Choudhary et al. | 370/328 |
| 2011/0246669 A1* | 10/2011 | Kanada et al. | 709/238 |
| 2012/0176934 A1 | 7/2012 | Farinacci et al. | |
| 2013/0311663 A1 | 11/2013 | Kamath et al. | |

FOREIGN PATENT DOCUMENTS

| | | |
|---|---|---|
| EP | 1946579 A1 | 7/2008 |
| WO | 2007045881 A1 | 4/2007 |
| WO | 2009/155374 A2 | 12/2009 |

OTHER PUBLICATIONS

Non-Final Office Action from U.S. Appl. No. 13/779,532 dated Oct. 22, 2014.
Final Office Action from U.S. Appl. No. 13/779,532 dated Jun. 17, 2015.
Notice of Allowance from U.S. Appl. No. 13/779,532, dated Oct. 20, 2015.
International Search Report and Written Opinion from PCT Application No. PCT/CN2013/072563, dated Jun. 27, 2013.
Notice of Allowance from U.S. Appl. No. 13/779,532, dated Jan. 13, 2016.
Corrected Notice of Allowability from U.S. Appl. No. 13/779,532, dated Mar. 10, 2016.

\* cited by examiner

OVERLAY TUNNEL INFORMATION EXCHANGE PROTOCOL

BACKGROUND

The present invention relates to data center infrastructure, and more particularly, this invention relates to exchanging tunnel information over an overlay network.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an interne protocol (IP)-based network. The overlay header includes an identifier (ID) that uniquely identifies the virtual network. The target switch strips off the overlay header encapsulation, UDP transport header, and IP header, and delivers the original packet to the destination end station. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

All unicast packets to known destinations are carried in unicast L3 packets by the tunnel end points. All broadcast packets, like address resolution protocol (ARP), standard L2 multicast packets, and unicast packets to unknown destinations are encapsulated in multicast L3 packets.

In order to support overlay networks like VXLAN, it is advantageous to support IP multicast and multicast routing protocols, like protocol independent multicast (PIM)-sparse mode (SM).

One conventionally used solution to providing address discovery protocol involves performing ARP functionality at the so-called virtual switches, which are actually software entities that reside within Hypervisors. Virtual switches connect multiple virtual end stations, e.g., devices like VMs, to each other and to the physical network.

However, the use of ARP to discover addresses has its drawbacks. Particularly, if an ARP request is originated from a VM, the ARP request is sent as a multicast packet using the multicast IP address through tunnels to all devices in a particular virtual network. Then, the device which recognizes the address referenced in the ARP packet responds to the ARP request indicating the device's media access control (MAC) address. In this way, the source MAC address of the destination device and the source IP address for the tunnel end points are learned by the device which sent the ARP request, and may be mapped together so that subsequent packets destined for this device may be sent without ARP. However, this involves the unnecessary step of repeating this flooding through the tunnel for each ARP request and for forwarding all packets having an unknown unicast destination address associated therewith. This results in a complex deployment of IP multicasting in IP networks which utilize network overlays.

SUMMARY

In one embodiment, a system includes logic adapted for receiving, at a first end point station, an information exchange packet from each end point station in a virtual network having a specified virtual network identifier (VNID) and logic adapted for processing each received information exchange packet to retrieve information about connections at each end point station in the virtual network having the specified VNID, wherein each end point station either terminates or originates a tunnel shared by the first end point station in an overlay network.

In another embodiment, a computer program product for exchanging overlay tunnel information includes a computer readable storage medium having computer readable program code embodied therewith, the computer readable program code including computer readable program code configured for receiving, at a first end point station, an information exchange packet from each end point station in a virtual network having a specified VNID, and computer readable program code configured for processing each received information exchange packet to retrieve information about connections at each end point station in the virtual network having the specified VNID, wherein each end point station either terminates or originates a tunnel shared by the first end point station in an overlay network.

Other aspects and embodiments of the present invention will become apparent from the following detailed description, which, when taken in conjunction with the drawings, illustrate by way of example the principles of the invention.

DETAILED DESCRIPTION

Figure 1:
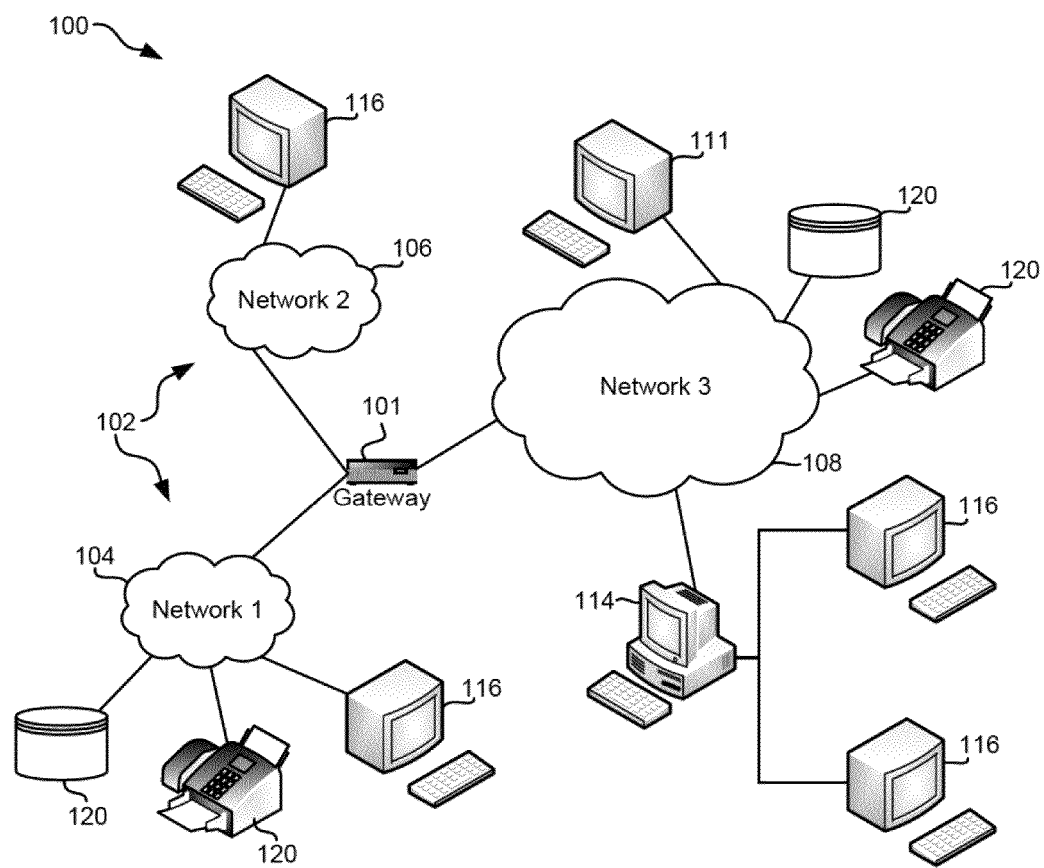
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, an overlay tunnel information exchange protocol (OTIEP) is implemented which may act in conjunction with (for legacy networks) or in place of address resolution protocol (ARP) for determining unknown addresses across an overlay network.

In one general embodiment, a system includes logic adapted for receiving, at a first end point station, an information exchange packet from each end point station in a virtual network having a specified virtual network identifier (VNID) and logic adapted for processing each received information exchange packet to retrieve information about connections at each end point station in the virtual network having the specified VNID, wherein each end point station either terminates or originates a tunnel shared by the first end point station in an overlay network.

In another general embodiment, a computer program product for exchanging overlay tunnel information includes a computer readable storage medium having computer readable program code embodied therewith, the computer readable program code including computer readable program code configured for receiving, at a first end point station, an information exchange packet from each end point station in a virtual network having a specified VNID, and computer readable program code configured for processing each received information exchange packet to retrieve information about connections at each end point station in the virtual network having the specified VNID, wherein each end point station either terminates or originates a tunnel shared by the first end point station in an overlay network.

In yet another general embodiment, a method for exchanging overlay tunnel information includes receiving an information exchange packet, at a first end point station, from each end point station in a virtual network having a specified VNID, and processing each received information exchange packet to retrieve information about connections at each end point station in the virtual network having the specified VNID, wherein each end point station either terminates or originates a tunnel shared by the first end point station in an overlay network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
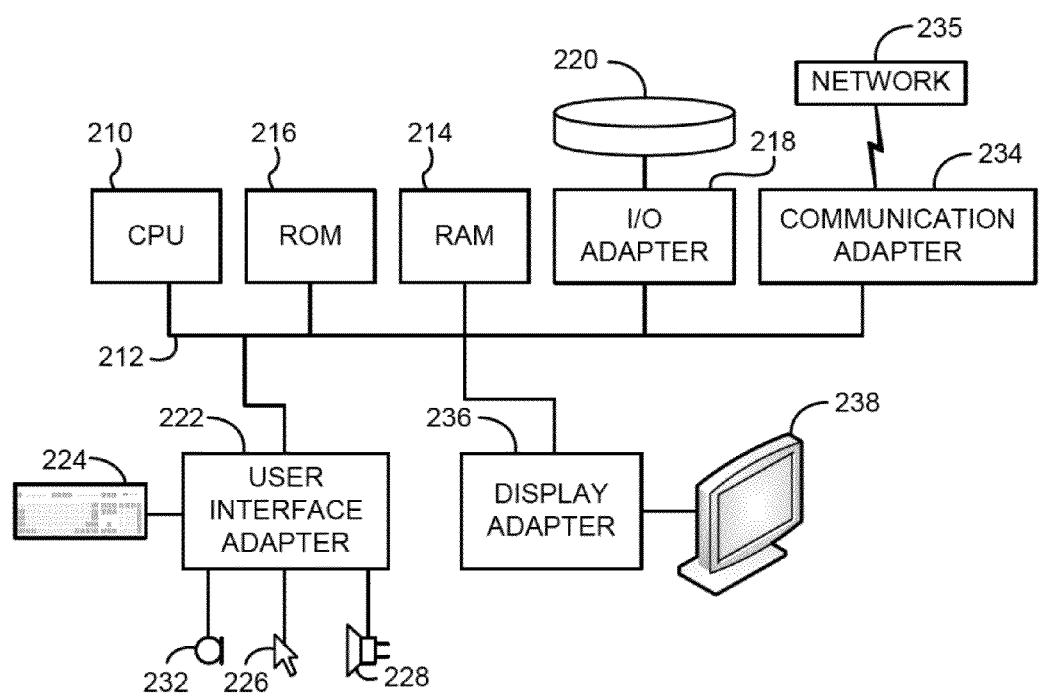
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
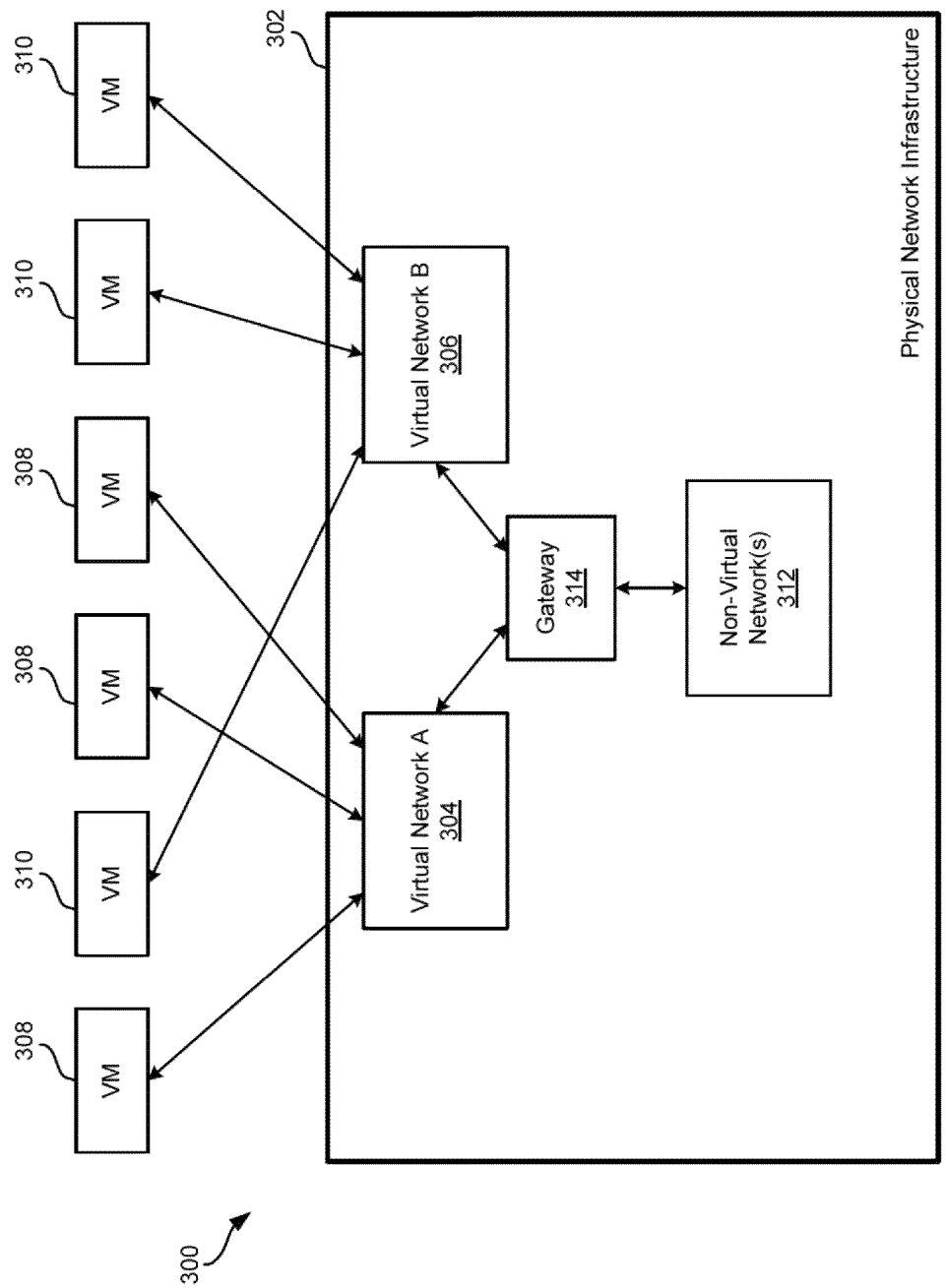
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may tunnel through one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer-3 domains, between one subnet to another subnet, internet protocol (IP) subnet to IP subnet, etc. But if it the architecture is similar to a large flat switch, in a very large layer-2 domain, then the VMs are aided in their attempt to move data across the architecture.

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling layer-2 packets over the layer-3 network by encapsulating the layer-2 packets into an overlay header. This may be performed using Virtual eXtensible Local Area Network (VXLAN) or some other overlay capable protocol, such as locator/ID separation protocol (LISP), overlay transport virtualization (OTV), etc. The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc. In order for a device to manage a tunnel, there needs to be a mapping between an original packet's source address, destination address, and a tunnel identifier. In this way, a physical server is capable of forwarding the encapsulated original packet to the proper destination device.

Figure 4:
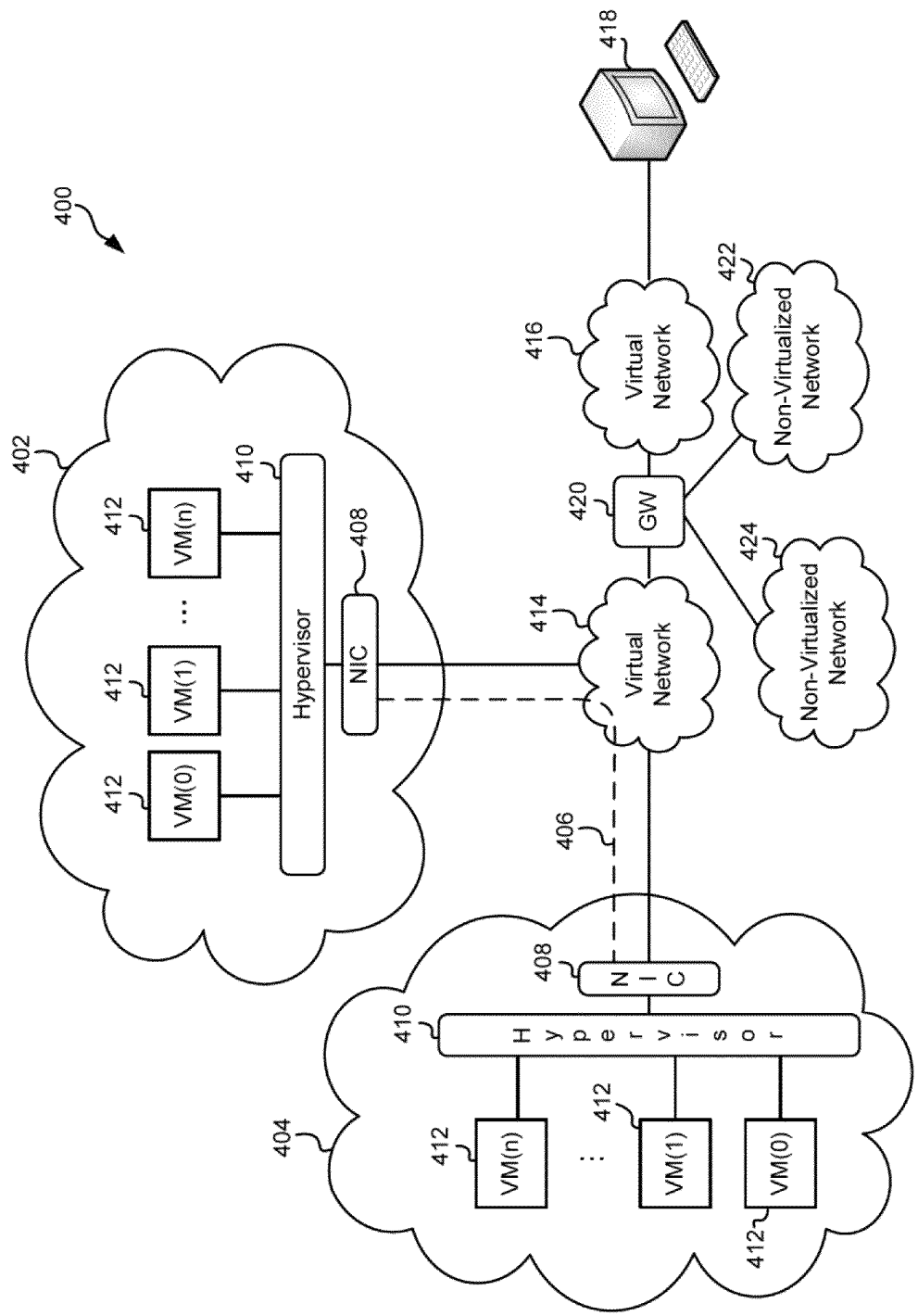
FIG. 4 shows a system that is capable of exchanging overlay tunnel information, according to the prior art.

FIG. 4 shows a system 400 according to one embodiment. As shown, the Hypervisors 410 are capable of tunneling 406 through the virtual network 414 to each other. Of course, this is a simplified architecture, and many more tunnels may exist, and many more end point stations (where tunnels are originated or terminated) may be in the overlay network, as would be understood by one of skill in the art.

Each Hypervisor 410 may be connected to any number of VMs 412. In addition, a network interface card (NIC) 408 may be located on a downstream side of each Hypervisor 410. A virtual overlay network gateway 420 may be provided to interface between virtual networks 414, 416, and any non-virtualized networks present, such as non-virtualized networks 422, 424, any of which may be enabled for VXLAN or not. In addition, a server 418 may be provided which may also function as a tunnel end point station, in some approaches.

The system 400, and particularly the first end point station, in some embodiments, may include logic adapted for receiving, at the first end point station (which may be Hypervisor 410 in network 402, Hypervisor in network 404, server 418, etc.), an information exchange packet from each end point station in a virtual network having a specified VNID. The system 400 also may include logic adapted for processing each received information exchange packet to retrieve information about connections at each end point station in the virtual network having the specified VNID. As used herein, each end point station either terminates or originates a tunnel shared by the first end point station in an overlay network.

In addition, the information exchange packet may comprise, at least, a media access control (MAC) address for each virtual machine (VM) connected to each end point station that is in the virtual network having the specified VNID. Furthermore, the system 400 may further include logic adapted for mapping tunnel identifiers for each end point station and the MAC address for each VM connected to each end point station.

In another approach, the system 400 may further include logic adapted for sending an information exchange packet to each tunnel end point in the virtual network having the specified VNID. Furthermore, the information exchange packet may include a MAC address for each VM connected to the first end point station, such as a forwarding database (FDB) record, that is in the virtual network having the specified VNID.

In more approaches, the information exchange packet may be sent in response to any one of the following events, among other possibilities: establishment of a tunnel, addition of a VM which is a member of the virtual network having the specified VNID, subtraction of a VM which is a member of the virtual network having the specified VNID, expiration of a predetermined amount of time, a change in a configuration of any VM in which is a member of the virtual network having the specified VNID, change in overlay gateway properties, and change of a tunnel information base (TIB) on any overlay gateway.

The tunnel end point stations may exchange information including local ARP entries from the virtual network having the specified VNID in the specified frame format, in some approaches.

According to another embodiment, the information exchange packet may be sent periodically, e.g., once per each period of time, such as every 30 seconds, 1 minute, 10 minutes, 30 minutes, 1 hour, 6 hours, etc. In this embodiment, the sending of the information exchange packet may act in conjunction with a "heartbeat" function, where if the information exchange packet is not received during an anticipated timeframe, a device which anticipated receipt of the packet may request that the packet be sent. If the packet is still not received, it may indicate a problem in communication or a device failure. Accordingly, an administrator may be alerted to such a situation, in an attempt to rectify and solve whatever issue may have arisen.

In another embodiment, the logic adapted for processing each received information exchange packet may comprise logic adapted for de-encapsulating an overlay header from the information exchange packet to retrieve an inner packet, and logic adapted for reading the inner packet to determine the information about each end point station in the virtual network having the specified VNID that is contained in the inner packet.

The system 400 may also include logic adapted for using the TIB to respond to an ARP request sent from a local member VM of the virtual network having the specified VNID. For example, the system 400 may include logic adapted for receiving an ARP request from a local member VM of the virtual network having the specified VNID, the ARP request including a subject IP address, logic adapted for resolving the ARP request by using the TIB to determine a MAC address corresponding to the subject IP address, and logic adapted for responding to the local member VM that sent the ARP request with the MAC address corresponding to the subject IP address.

Figure 5:
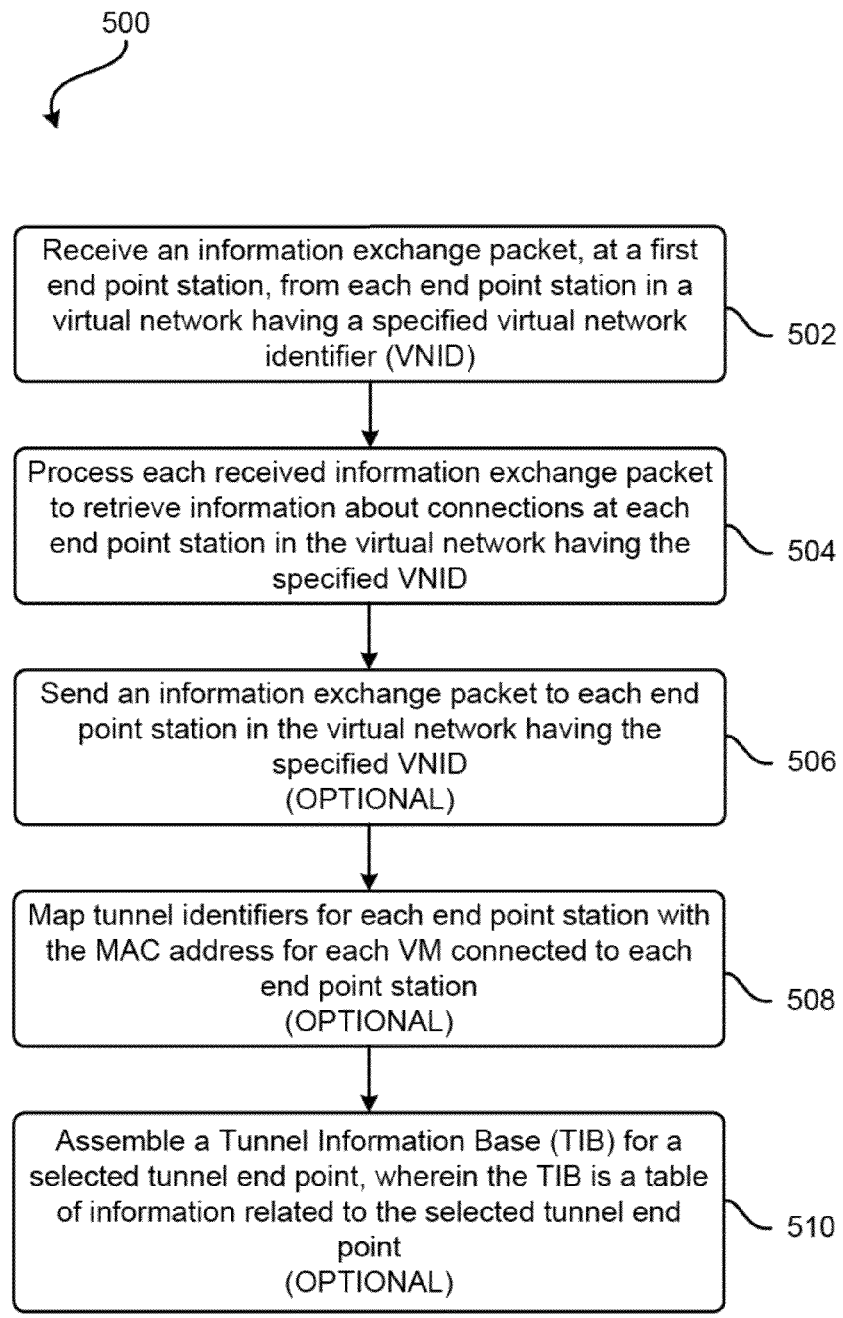
FIG. 5 is a flowchart of a method, according to one embodiment.

Now referring to FIG. 5, a flowchart of a method 500 for exchanging overlay tunnel information is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by an overlay switch, a processor (such as a CPU, an ASIC, a FPGA, etc.), an end point station (such as a Hypervisor, virtual overlay network gateway device, overlay switch capable of originating or terminating a tunnel, etc.), or computer program code embedded in a computer readable storage medium, in various approaches.

As used herein, an end point station is any device, physical or virtual, that is capable of terminating or originating a tunnel (such that the end point resides at the device). Some examples of end point stations include Hypervisors, virtual overlay network gateway devices, switches capable of overlay functionality, VMs capable of overlay functionality, etc.

As shown in FIG. 5, method 500 may initiate with operation 502, where an information exchange packet is received at a first end point station. Multiple information exchange packets may be received from any one end point station, and information exchange packets are received from each end point station that resides in a virtual network having a specified virtual network identifier (VNID).

In each embodiment of method 500, each end point station either terminates or originates a tunnel shared by the first end point station in an overlay network. In this way, the first end point station, by performing method 500, is able to determine all devices which are accessible through tunnels that the first end point station is capable of utilizing.

In operation 504, each received information exchange packet is processed to retrieve information about connections at each end point station in the virtual network having the specified VNID. The connections at each end point station may be to switches, routers, VMs, or any other devices that are connected to the end point station and are in the specified virtual network.

According to one approach, the processing of each received information exchange packet may comprise de-encapsulating an overlay header from the information exchange packet to retrieve an inner packet, and reading the inner packet to determine or otherwise discovering the information about connections at each end point station in the virtual network having the specified VNID that is contained in the inner packet, as sent by each end point station.

In one embodiment, the information exchange packet may comprise, at least, a MAC address for each VM connected to each end point station that is in the virtual network having the specified VNID. In this way, when a packet is intended for one of these VMs at a termination of a tunnel, the first end point station will know which tunnel to send the packet in order to reach the proper VM.

In one embodiment, the method 500 may further include optional operation 506, where an information exchange packet may be sent to each end point station in the virtual network having the specified VNID. According to one approach, the information exchange packet may comprise at least MAC addresses for each VM connected to the first end point station that is in the virtual network having the specified VNID. In this way, each end point station that shares a tunnel with the first end point station will learn all the MAC addresses of VMs connected to the first end point station.

In a further embodiment, the information exchange packet may be sent in response to any action, event, change, or condition being met. According to one example, any one of the following may trigger the information exchange packet to be sent: establishment of a tunnel, addition of a VM which is a member of the virtual network having the specified VNID, subtraction of a VM which is a member of the virtual network having the specified VNID, expiration of a predetermined amount of time, a change in a configuration of any VM in which is a member of the virtual network having the specified VNID, change in overlay gateway properties, and change of a TIB on any overlay gateway.

According to another embodiment, the information exchange packet may be sent periodically, e.g., once per each period of time, such as every 30 seconds, 1 minute, 10 minutes, 30 minutes, 1 hour, 6 hours, etc. In this embodiment, the sending of the information exchange packet may act in conjunction with a "heartbeat" function, where if the information exchange packet is not received during an anticipated timeframe, a device which anticipated receipt of the packet may request that the packet be sent. If the packet is still not received, it may indicate a problem in communication or a device failure. Accordingly, an administrator may be alerted to such a situation, in an attempt to rectify and solve whatever issue may have arisen.

According to another embodiment, the method 500 may further include optional operation 508, where tunnel identifiers for each end point station and the MAC address for each VM connected to each end point station may be mapped. The mapping may be performed by creating a list of all MAC addresses for VMs along with the tunnel identifier where those VMs are accessible.

In a further approach, the method 500 may further include optional operation 510, where a Tunnel Information Base (TIB) may be assembled (such as from information in the information exchange packet, and other information available to or determinable by a point end station or a hypervisor operating on a point end station). In this way, the MAC address for each VM connected to each end point station and other information may be included in the TIB, which may be maintained in various forms. In one embodiment, the TIB may be a table of information related to tunnel end points which may comprise any or all of the following: a Tunnel ID, the specified VNID, MAC addresses of member VMs of the virtual network having the specified VNID, virtual port numbers corresponding to a hosting hypervisor, ARP entries learnt by the member VMs of the virtual network having the specified VNID, timers related to tunnel end points, a tunnel end point source IP Address, a point-to-point or multipoint nature of the tunnel, an IP Address of a peer tunnel end point, shared forwarding tables of all the member VMs of the virtual network having the specified VNID, a default Gateway MAC address of each of the member VMs, multicast MAC and IP addresses used by all the member VMs of the virtual network having the specified VNID, and/or Virtual Port members or a Mask of member virtual ports of the virtual network having the specified VNID.

According to another embodiment, the method may further include an exchange operation where tunnel identifiers for each tunnel end point and the ARP entries for each VM using that tunnel end point may be mapped. The mapping may be performed by creating a list of all ARP entries for VMs along with the tunnel identifier where those VM ARPs are accessible. In one embodiment, the mapping may comprise assembling a TIB.

This TIB may be used to respond to ARP requests sent from local VMs that are hosted by a tunnel end point station. The hypervisor on this tunnel end point station may search the TIB to determine if the requested information is stored (e.g., the MAC address corresponding the requested IP address in the ARP request). If the TIB includes this information, then the hypervisor on this tunnel end point station may resolve the ARP request, and respond to the requesting local VM with the MAC address matching the requested IP address. In this way, the network is precluded from having the ARP request flooded out to all VMs, since the hypervisor may not send out the ARP request after the address has been determined (locally using information in the TIB).

A local VM may be any VM which is hosted by a hypervisor on a particular end point station, which may therefore resolve the ARP request without flooding the network with the request.

According to another embodiment, the TIB may be used to respond to an ARP request sent from a local member VM of the virtual network having the specified VNID. For example, the method 500 may include receiving an ARP request from a local member VM of the virtual network having the specified VNID, the ARP request including a subject IP address, resolving the ARP request by using the TIB to determine a MAC address corresponding to the subject. IP address, and responding to the local member VM that sent the ARP request with the MAC address corresponding to the subject IP address.

According to another embodiment, the method 500 may be executed from a computer program product using a processor capable of executing such computer readable program code. For example, a computer program product for exchanging overlay tunnel information may include a computer readable storage medium having computer readable program code embodied therewith. The computer readable program code may comprise some or all of: computer readable program code configured for receiving, at a first end point station, an information exchange packet from each end point station in a virtual network having a specified VNID, and computer readable program code configured for processing each received information exchange packet to retrieve information about connections at each end point station in the virtual network having the specified VNID. In this embodiment, each end point station either terminates or originates a tunnel shared by the first end point station in an overlay network.

In one approach, the information exchange packet may comprise at least a MAC address for each VM connected to each end point station that is in the virtual network having the specified VNID. In addition, the tunnel identifier for a tunnel which has access to each VM may be learnt based on which tunnel the information exchange packet is received on.

Furthermore, the computer program product may include computer readable program code configured for mapping tunnel identifiers for each end point station and the MAC address for each VM hosted at each end point station.

In addition, the computer program product may include computer readable program code configured for sending an information exchange packet to each end point station in the virtual network having the specified VNID.

In any embodiment described herein, the information exchange packet may be sent in response to any one of the following, among other possible events: establishment of an overlay tunnel, addition of a VM which is a member of the virtual network having the specified VNID, subtraction of a VM which is a member of the virtual network having the specified VNID, expiration of a predetermined amount of time, a change in a configuration of any VM in which is a member of the virtual network having the specified VNID, change in overlay gateway properties, and change of a TIB on any overlay gateway.

According to another embodiment, the information exchange packet may be sent periodically, e.g., once per each period of time, such as every 30 seconds, 1 minute, 10 minutes, 30 minutes, 1 hour, 6 hours, etc. In this embodiment, the sending of the information exchange packet may act in conjunction with a "heartbeat" function, where if the information exchange packet is not received during an anticipated timeframe, an end point station which anticipated receipt of the packet may request that the packet be sent. If the packet is still not received, it may indicate a problem in communication or a device failure. Accordingly, an administrator may be alerted to such a situation, in an attempt to rectify and solve whatever issue may have arisen.

In another approach, the computer readable program code configured for processing each received information exchange packet may comprise computer readable program code configured for de-encapsulating an overlay header from the information exchange packet to retrieve an inner packet, and computer readable program code configured for reading the inner packet to determine the information about each end point station in the virtual network having the specified VNID that is contained in the inner packet.

Figure 6:
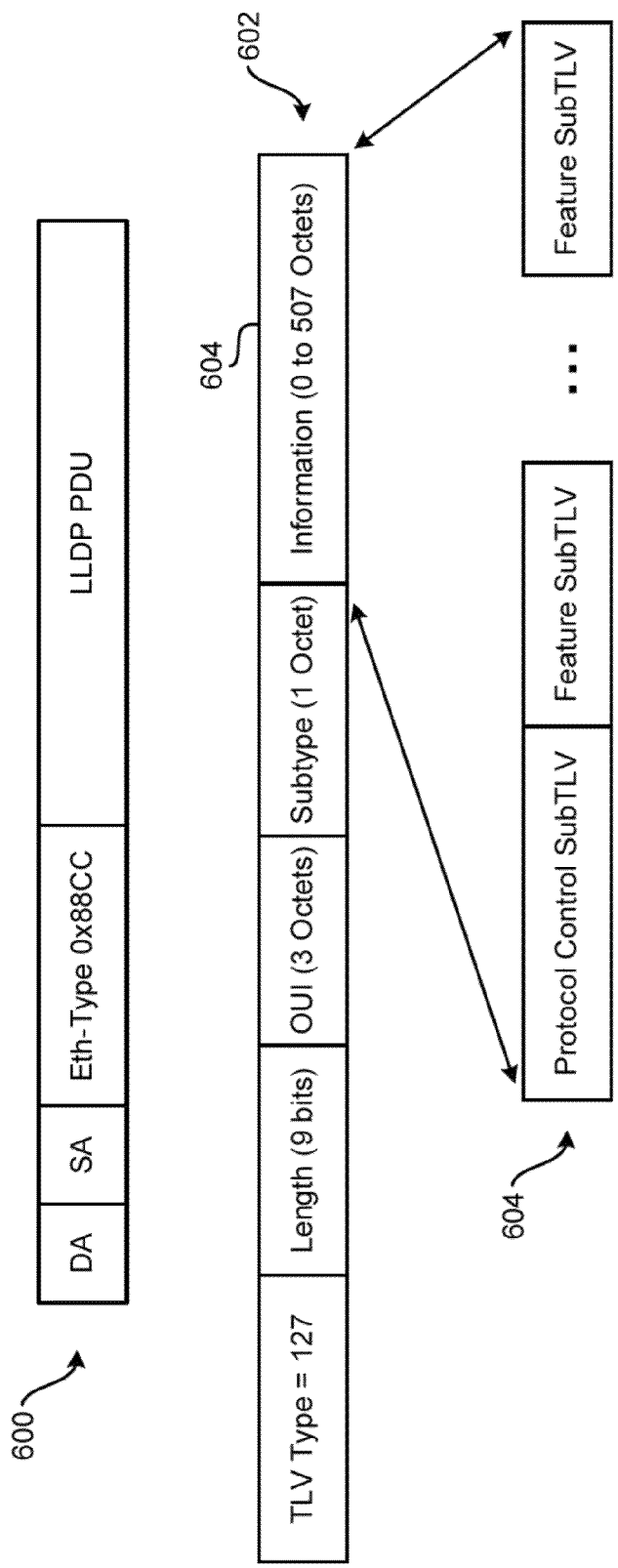
FIG. 6 is a simplified schematic of frame formats for the overlay tunnel information exchange protocol, according to one embodiment.

Now referring to FIG. 6, a simplified schematic of frame formats for the OTIEP are shown, according to one embodiment. The Ethernet Frame Format 600 is shown graphically as a series of blocks, each block comprising some data. There are different portions of the Ethernet Frame Format 600 shown, including a destination address (DA), a source address (SA), an Ether-type identifier (Eth-Type0x88CC), and a Link Layer Discovery Protocol (LLDP) protocol data unit (PDU).

Each tunnel end point may create such frames, encapsulate them in an overlay tunnel header/UDP/IP, and send the encapsulated frames to the tunnel peer.

According to the embodiments described herein, a new request-response and voluntary TIB exchange process has been suggested for exchanging overlay tunnel information between end point stations. For such interactions, LLDP may be used, which may be described as a Link Layer protocol in the Internet Protocol Suite that is used by network devices (from multiple vendors) in order to broadcast the network device's identity, characteristics, and adjacent devices on an Ethernet network. In order to utilize LLDP for the purposes described herein, according to various embodiments, some new Type-Length-Value (TLV)s have been added to LLDP. These may be described as an organizationally specific OTIEP TLV structure. The novel OTIEP LLDP packet format 602 includes a TLV Type field, set as TLV Type 127 (but may be set to any agreed upon value as long as it is consistently used and does not coincide with other TLV types already in use), a Length field which may be 9 bits, an Organizationally Unique Identifier (OUI) field which may be 3 octets, a Subtype field which may be 1 octet, and information 604 about the end point stations that is being shared which may be anywhere from 0 octets to 507 octets, depending on the need for space (e.g., amount of information being conveyed). Should more space be needed, additional OTIEP LLDP packets may be sent.

The TIB PDU may be sent per tunnel and per VNID. Information of multiple VNIDs should not be grouped together into one TIB PDU. Instead, more than one TIB PDU should be sent, each with information about only one VNID.

In one approach, the OTIEP Header may include the information shown in the following block:

| | |
|---|---|
| Protocol Version: | 1 |
| PDU Type: | Init/Request/Response |
| ONID: | 24 bit |
| Number of VTEPs: | 16 bit |
| VTEP Info Type: | 16 bit (ARP, FDB, etc . . . ) | where VTEP is a virtual tunnel end point, ONID is an overlay network identifier, and FDB is a forwarding database.

In another approach, the OTIEP Payload may include the information shown in the next block:

| Values for specific data of VTEP Info Type. (Presented in List form) |
|---|

According to one embodiment, a mechanism for exchanging overlay tunnel information may proceed as follows. The OTIEP has a control state machine, and this state machine may handle the trigger criteria to start the TIB exchange between the peer end point stations on a particular VNID. The state machine may have the following functionality, in one approach:

1. Every TIB exchange may have a TIB TYPE and TIME STAMP;
2. Each TIB exchange may occur at boot-up when peer end point station links come up. Most often the non-gateway system may initiate the exchange. To keep overheads low, this process may be asynchronous (but synchronous processing is also possible, in other approaches).
3. TIB exchange may also be triggered due to a configuration change on one of the tunnel end points.
4. TIB exchange can may occur at the end of a TIB exchange interval, thereby providing period updating.
5. The recipient of the system may be provided a choice of keeping or tossing the data, depending upon the available memory space to store the TIBs.
6. The TIB exchange frequency may be programmable per end point station; however, the end point stations may exchange the frequency of updates and agree to a common updating frequency.

Of course, more or less functionality in the state machine is possible, according to various embodiments, and as would be apparent to one of skill in the art upon reading the present descriptions.

Figure 7:
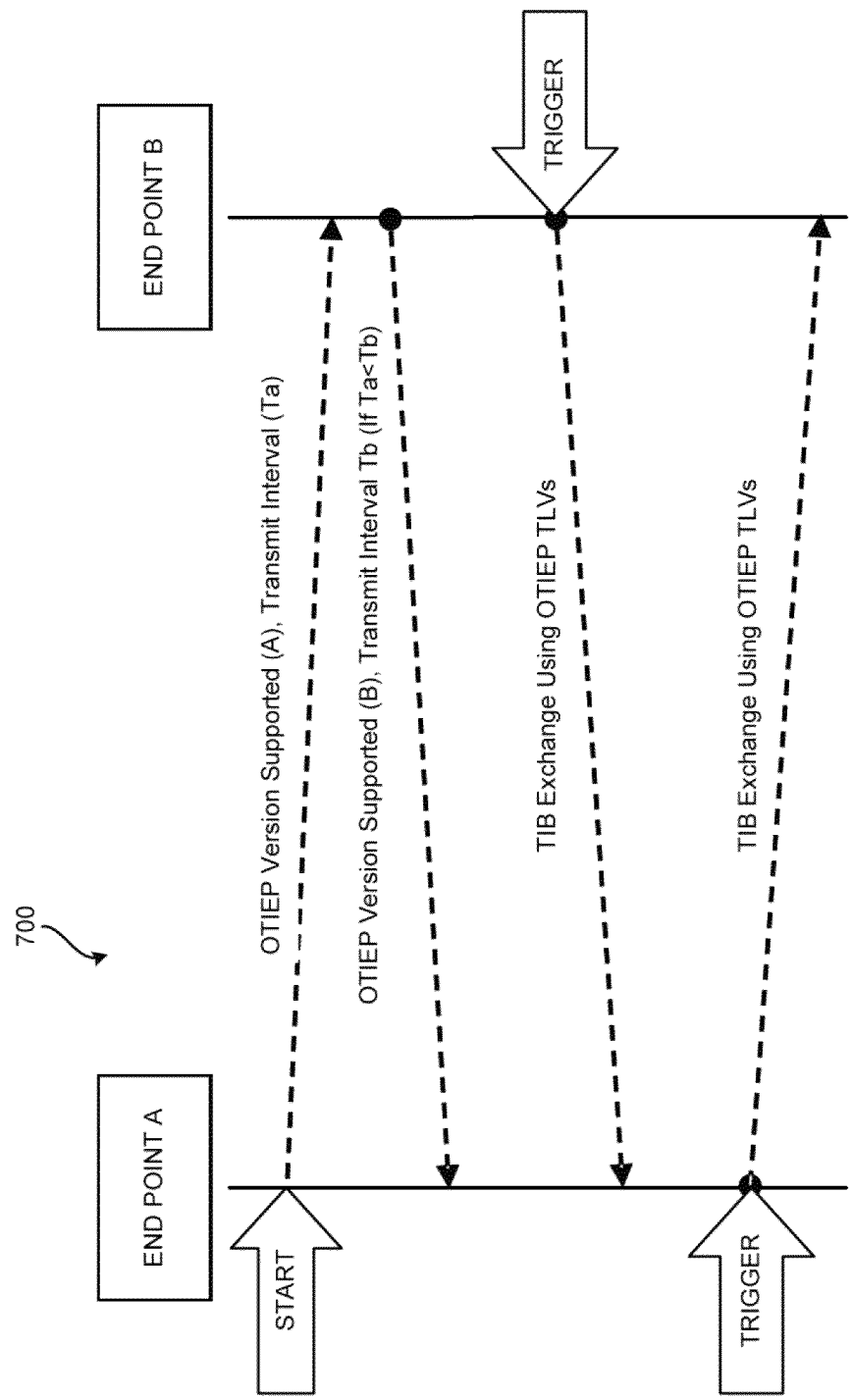
FIG. 7 is a simplified schematic of timing for information exchange using the overlay tunnel information exchange protocol, according to one embodiment.

As shown in FIG. 7, information exchange 700 in the OTIEP may utilize different packets at different timing intervals, as determined by circumstances and be selection by an administrator of the system. As shown in FIG. 7, end point station A 702 is exchanging information with end point station B 704. As an example, it is assumed that end point station A 702 communicates overlay tunnel information first (since Ta<Tb, were this reversed and Tb<Ta, then end point station B 704 would send information first), and sends this information to end point station B 704. Then, when the second time interval Tb is reached, end point station B 704 sends overlay tunnel information to end point station A 702. Then, when triggering events occur, TIB exchanges may take place using OTIEP TLVs between end point station A 702 and end point station B 704. Of course, this schematic is presented for exemplary purposes only, and is not meant to be limiting in any way on the embodiments and approaches described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a processor and logic integrated with and/or executable by the processor, the logic being configured to cause the processor to:
receive, by the processor at a first end point station, information exchange packets from all end point stations in a virtual network having a specified virtual network identifier (VNID); and
process each received information exchange packet to retrieve information about connections at each end point station in the virtual network having the specified VNID, wherein each end point station either terminates or originates a tunnel shared by the first end point station in an overlay network, and
wherein each of the information exchange packets comprise a media access control (MAC) address for all member virtual machines (VMs) in the virtual network having the specified VNID connected to each end point station in the virtual network having the specified VNID.

2. The system as recited in claim 1, wherein the logic is further configured to cause the processor to request that a second end point station send an information exchange packet to the first end point station in response to an information exchange packet not being received from the second end point station in the virtual network having the specified VNID during an anticipated timeframe.

3. The system as recited in claim 1, wherein the logic is further configured to cause the processor to map tunnel identifiers for each end point station and the MAC address of each member VM hosted in the virtual network having the specified VNID which uses that end point station.

4. The system as recited in claim 1, wherein the logic is further configured to cause the processor to assemble a Tunnel Information Base (TIB) for a selected tunnel end point, wherein the TIB is a table of information related to the selected tunnel end point, the TIB comprising:
a Tunnel ID,
the specified VNID,
MAC addresses of the member VMs of the virtual network having the specified VNID,
virtual port numbers corresponding to a hosting hypervisor,
Address Resolution Protocol (ARP) entries learnt by the member VMs of the virtual network having the specified VNID,
timers related to tunnel end points,
a tunnel end point source internet protocol (IP) Address,
a point-to-point or multipoint nature of the tunnel,
an IP Address of a peer tunnel end point,
shared forwarding tables of all the member VMs of the virtual network having the specified VNID,
a default Gateway MAC address of each of the member VMs,
multicast MAC and IP addresses used by all the member VMs of the virtual network having the specified VNID, and
Virtual Port members or a Mask of member virtual ports of the virtual network having the specified VNID.

5. The system as recited in claim 4, wherein the logic is further configured to cause the processor to:
receive an ARP request from a local member VM of the virtual network having the specified VNID, the ARP request including a subject IP address;
resolve the ARP request by using the TIB to determine a MAC address corresponding to the subject IP address; and
respond to the local member VM that sent the ARP request with the MAC address corresponding to the subject IP address.

6. The system as recited in claim 1, wherein the logic is further configured to cause the processor to send an information exchange packet to each end point station in the virtual network having the specified VNID.

7. The system as recited in claim 6, wherein the information exchange packet comprises a media access control (MAC) address for each member virtual machine (VM) of the virtual network having the specified VNID connected to the first end point station.

8. The system as recited in claim 6, wherein the information exchange packet is sent in response to one of the following: establishment of a tunnel, addition of a virtual machine (VM) which is a member of the virtual network having the specified VNID, subtraction of a VM which is a member of the virtual network having the specified VNID, expiration of a predetermined amount of time, a change in a configuration of any VM in which is a member of the virtual network having the specified VNID, change in overlay gateway properties, and change of a tunnel information base (TIB) on any overlay gateway.

9. The system as recited in claim 1, wherein the logic configured to cause the processor to process each received information exchange packet is further configured to cause the processor to:
   de-encapsulate an overlay header from the information exchange packet to retrieve an inner packet; and
   read the inner packet to determine the information about each end point station in the virtual network having the specified VNID.

10. A computer program product for exchanging overlay tunnel information, the computer program product comprising a computer readable hardware storage device having computer readable program code embodied therewith, the computer readable program code comprising:
   computer readable program code configured for receiving, at a first end point station, an information exchange packet from each end point station in a virtual network having a specified virtual network identifier (VNID); and
   computer readable program code configured for processing each received information exchange packet to retrieve information about connections at each end point station in the virtual network having the specified VNID,
   wherein each end point station either terminates or originates a tunnel shared by the first end point station in an overlay network, and
   wherein the information exchange packet comprises a media access control (MAC) address for each member virtual machine (VM) of the virtual network having the specified VNID connected to each end point station.

11. The computer program product as recited in claim 10, further comprising computer readable program code configured for mapping tunnel identifiers for each end point station and the MAC address for each VM hosted in the virtual network having the specified VNID which uses that end point station.

12. The computer program product as recited in claim 10, further comprising computer readable program code configured for assembling a Tunnel Information Base (TIB) for a selected tunnel end point, wherein the TIB is a table of information related to the selected tunnel end point, the TIB comprising:
   a Tunnel ID,
   the specified VNID,
   MAC addresses of the member VMs of the virtual network having the specified VNID,
   virtual port numbers corresponding to a hosting hypervisor,
   Address Resolution Protocol (ARP) entries learnt by the member VMs of the virtual network having the specified VNID,
   timers related to tunnel end points,
   a tunnel end point source internet protocol (IP) Address,
   a point-to-point or multipoint nature of the tunnel,
   an IP Address of a peer tunnel end point,
   shared forwarding tables of all the member VMs of the virtual network having the specified VNID,
   a default Gateway MAC address of each of the member VMs,
   multicast MAC and IP addresses used by all the member VMs of the virtual network having the specified VNID, and
   Virtual Port members or a Mask of member virtual ports of the virtual network having the specified VNID.

13. The computer program product as recited in claim 12, further comprising:
   computer readable program code configured for receiving an ARP request from a local member VM of the virtual network having the specified VNID, the ARP request including a subject IP address;
   computer readable program code configured for resolving the ARP request by using the TIB to determine a MAC address corresponding to the subject IP address; and
   computer readable program code configured for responding to the local member VM that sent the ARP request with the MAC address corresponding to the subject IP address.

14. The computer program product as recited in claim 10, further comprising computer readable program code configured for sending an information exchange packet to each end point station in the virtual network having the specified VNID.

15. The computer program product as recited in claim 14, wherein the information exchange packet comprises media access control (MAC) addresses of member virtual machines (VMs) of the virtual network having the specified VNID.

16. The computer program product as recited in claim 14, wherein the information exchange packet is sent in response to one of the following: establishment of a tunnel, addition of a virtual machine (VM) which is a member of the virtual network having the specified VNID, subtraction of a VM which is a member of the virtual network having the specified VNID, expiration of a predetermined amount of time, a change in a configuration of any VM in which is a member of the virtual network having the specified VNID, change in overlay gateway properties, and change of a tunnel information base (TIB) on any overlay gateway.

17. The computer program product as recited in claim 10, wherein the computer readable program code configured for processing each received information exchange packet comprises:
   computer readable program code configured for de-encapsulating an overlay header from the information exchange packet to retrieve an inner packet; and
   computer readable program code configured for reading the inner packet to determine the information about each end point station of the virtual network having the specified VNID that is contained in the inner packet.

* * * * *